United States Patent
Fiaschi et al.

(10) Patent No.: US 11,336,571 B2
(45) Date of Patent: *May 17, 2022

(54) CONTROL OF MULTI-LAYER COMMUNICATION NETWORK

(71) Applicant: Telefonaktiebolaget LM Ericsson (publ), Stockholm (SE)

(72) Inventors: Giovanni Fiaschi, Stockholm (SE); Diego Caviglia, Stockholm (SE); Daniele Ceccarelli, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 11 days.

This patent is subject to a terminal disclaimer.

(21) Appl. No.: 16/883,048

(22) Filed: May 26, 2020

(65) Prior Publication Data

US 2020/0304407 A1 Sep. 24, 2020

Related U.S. Application Data

(63) Continuation of application No. 15/761,978, filed as application No. PCT/EP2015/073819 on Oct. 14, 2015, now Pat. No. 10,700,967.

(51) Int. Cl.
*H04L 12/715* (2013.01)
*H04L 45/64* (2022.01)
(Continued)

(52) U.S. Cl.
CPC .............. *H04L 45/64* (2013.01); *H04L 45/04* (2013.01); *H04L 45/302* (2013.01)

(58) Field of Classification Search
CPC ................................ H04L 45/64; H04L 45/04
See application file for complete search history.

(56) References Cited

U.S. PATENT DOCUMENTS 10,700,967 B2 * 6/2020 Fiaschi .................. H04L 45/04

FOREIGN PATENT DOCUMENTS

WO 2012013216 A1 2/2012
WO 2015070892 A1 5/2015
(Continued)

OTHER PUBLICATIONS

Ceccarelli, Daniele, et al., "Framework for Abstraction and Control of Traffic Engineered Networks", draft-ceccarelli-teas-actn-framework-01; TEAS Working Group; Internet Draft; IETF Trust, Mar. 9, 2016, pp. 1-28.
(Continued)

*Primary Examiner* — Jamal Javaid
(74) *Attorney, Agent, or Firm* — Murphy, Bilak & Homiller, PLLC

(57) ABSTRACT

Embodiments include methods of controlling a client layer of a multi-layer communication network that also includes a server layer. Such methods include receiving, at a client physical network controller (PNC), an indication of at least one characteristic associated with one or more paths between server network nodes in the server layer. The indication is received from a multi-domain service controller (MDSC) in the multi-layer communication network, and the server layer is controlled by a server PNC. Such methods include, based on the at least one characteristic, computing one or more paths in the client layer that facilitate protection and/or restoration for the one or more paths in the server layer. Other embodiments include complementary methods performed by a MDSC, as well as client PNCs and MDSCs configured to perform such methods.

20 Claims, 9 Drawing Sheets

(51) Int. Cl.
*H04L 45/00* (2022.01)
*H04L 45/302* (2022.01)

(56) References Cited

FOREIGN PATENT DOCUMENTS

WO     2015124200 A1    8/2015
WO     WO-2015124200 A1 *   8/2015  ............. H04L 45/64

OTHER PUBLICATIONS

Ceccarelli, Daniele, et al., "Framework for Abstraction and Control of Transport Networks", draft-ceccarelli-actn-framework-07.txt; Internet Engineering Task Force (IETF), Standard working draft, Internet Society; Geneva, Switzerland, Mar. 9, 2015, pp. 1-24.
Kompella, K., et al., "OSPF Extensions in Suppod of Generalized Multi-Protocol Label Switching (GMPLS)", Network Working Group; The Internet Society, Oct. 2005, pp. 1-11.
Le Roux, J. L., "Path Computation Element Communication Protocol (PCECP) Specific Requirement for Inter-Area MPLS and GMPLS Traffic Engineering", Network Working Group; The IETF Trust, Jun. 2007, pp. 1-12.
Vilalta, R., et al., "Hierarchical SDN Orchestration for Multi-technology Multi-domain Networks with Hierarchical ABNO", 2015 European Conference on Optical Communication (ECOC); Viages el Code Ingles, Vecisa, Sep. 27, 2015, pp. 1-3.

* cited by examiner

CONTROL OF MULTI-LAYER COMMUNICATION NETWORK

CROSS-REFERENCE TO RELATED APPLICATION(S)

This application is a continuation of, and claims the benefit of priority from, U.S. patent application Ser. No. 15/761,978 filed on Mar. 21, 2018, which is a U.S. national-stage application claiming priority to international application PCT/EP2015/073819 filed on Oct. 14, 2015. The entire disclosures of the above-mentioned applications are incorporated herein by reference for all purposes.

TECHNICAL FIELD

The disclosure relates to a method of controlling a multi-layer communication network comprising a client network and a server network. The disclosure further relates to an improved control entity for a multi-layer communication network and to an improved multi-layer communication network.

BACKGROUND

Recovery mechanisms in multi-layer communication networks are among the features most frequently requested by network operators for OPEX and CAPEX reduction in transport networks. The most classic example is packet-optical integration, where the packet layer control plane needs fully diverse paths in the optical layer; so that a single fault in the optical layer does not affect multiple branches of a protection scheme in the packet layer.

The Internet Engineering Task Force, IETF, has been working on this for long time and two solutions have been standardized for path diversity in distributed control plane environments. In the first, GMPLS UNI, defined in RFC4203, RSVP-TE extensions have been defined for the collection of Shared Risk Link Groups, SRLGs. The procedure envisages the packet domain requesting setup of a label switched path, LSP, in the optical domain, collecting the SRLGs of a given LSP and performing a second (or further) request asking to avoid SRLGs during the computation of the path. In the second, PCEP, defined in RFC4927, allows a single request to be made to the optical layer specifying the need for two or more diverse paths. The identifiers of such LSPs are returned to the packet domain, which does not have any kind of information about the paths except that they are diverse.

The market trends are moving from the fully distributed control planes of Internet Protocol/Multiprotocol label switching, IP/MPLS, and generalized MPLS, GMPLS, to transport software-defined networking, SDN. In SDN, multi-layer networks can be managed by a single SDN controller or by a hierarchy of SDN controllers.

The IETF is currently working on a framework standardizing an interface between SDN controllers; this is called the Abstraction and Control of Transport Networks, ACTN, framework and is described in draft IETF document draft-ceccarelli-teas-actn-framework-00.txt of 15 Jun. 2015.

The ACTN framework defines two types of SDN controller: the Physical Network Controller, PNC; and the Multi Domain Service Controller (or Coordinator), MDSC. The PNC is often provided by the same vendor of the network to be controlled, mostly in the optical case, and often proprietary interfaces are used between the controller and the nodes. By means of a standard interface, which does not deal with physical impairments of nodes specific characteristics and based on standard models, it is possible to have a parent SDN controller, the MDSC, which allows for end to end path computation and provisioning based on an abstracted view of the network.

The current ACTN definitions work well for multi-domain environments, where the MDSC provides a summarized view of a multi-domain networks and the PNCs are allowed to ignore information about each other, because the sub-networks are on the same layer and independent. More complete support for multi-layer arrangements is desirable.

SUMMARY

It is an object to provide an improved method of controlling a multi-layer communication network comprising a client network and a server network. It is a further object to provide an improved control entity for a multi-layer communication network. It is a further object to provide an improved multi-layer communication network.

A first aspect of the disclosure provides a method of controlling a multi-layer communication network comprising a client network and a server network. The method comprises obtaining from the server network at least one path characteristic for a path in the server network between server network nodes. The method further comprises providing to the client network an indication of the at least one path characteristic of the server network.

The method may enable communication of information from a server network to a client network in a multi-layer communication network. This is not possible under the current ACTN framework specification and the method may provide a solution to this limitation of the current ACTN framework specification. By providing the client network with a path characteristic, for a corresponding path in the server network, for each client network link the method may enable the client network to properly configure protection schemes and restoration schemes within the client network.

The method may provide enhancement to the ACTN framework to enable information to be provided from the server network to the client network, including SRLG information, essential to properly configure protection and restoration schemes in the client network, as well as other link characteristics, such as bandwidth and delay.

A second aspect of the disclosure provides a control entity for a multi-layer communication network comprising a client network and a server network. The control entity comprises a server network interface module configured to obtain from the server network at least one path characteristic for paths in the server network. The control entity further comprises a client network interface module configured to provide to the client network an indication of the at least one path characteristic of the server network.

The control entity may enable communication of information from a server network to a client network in a multi-layer communication network. This is not possible using the SDN controllers defined in the current ACTN framework specification and the control entity may provide a solution to this limitation of the current ACTN framework specification. By providing the client network with a path characteristic, for a corresponding path in the server network, for each client network link the control entity may enable the client network to properly configure protection schemes and restoration schemes within the client network.

A third aspect of the disclosure provides a client layer controller configured to control a client layer of a multi-layer communication network comprising the client layer and a server layer. The client layer controller is configured to receive an indication from a control entity of a higher network control level of at least one path characteristic of a server layer of the multi-layer communication network.

A fourth aspect of the disclosure provides a method of controlling a client layer of a multi-layer communication network, comprising receiving at a client layer controller an indication from a control entity of a higher network control level of at least one path characteristic of a server layer of the multi-layer communication network, and configuring the client layer based on the received at least one path characteristic.

A fifth aspect of the disclosure provides a multi-layer communication network comprising a client network control entity configured to control a client network comprising a plurality of client network nodes. A server network control entity configured to control a server network comprising a plurality of server network nodes; and a multi-layer network control entity communicatively connected to each of the client network control entity and the server network control entity. The multi-layer network control entity is configured to obtain from the server network at least one path characteristic for paths in the server network between server network nodes. The multi-layer network control entity is configured to provide to the client network, for client network links, the at least one path characteristic for a corresponding path in the server network.

A sixth aspect of the disclosure provides a control entity for a multi-layer communication network comprising a client network and a server network. The control entity comprising a processor and a memory, the memory containing instructions that when executed by the processor cause the processor to obtain from the server network at least one path characteristic for a path in the server network between server network nodes; and provide to the client network an indication of the at least one path characteristic of the server network.

A seventh aspect of the disclosure provides a carrier containing a computer program comprising instructions which, when executed on at least one processor, cause the at least one processor to carry out the method according to any example.

BRIEF DESCRIPTION OF THE DRAWINGS

Embodiments of the disclosure will now be described, by way of example only, with reference to the accompanying drawings.

DETAILED DESCRIPTION

The same reference numbers will used for corresponding features in different embodiments.

Figure 1:
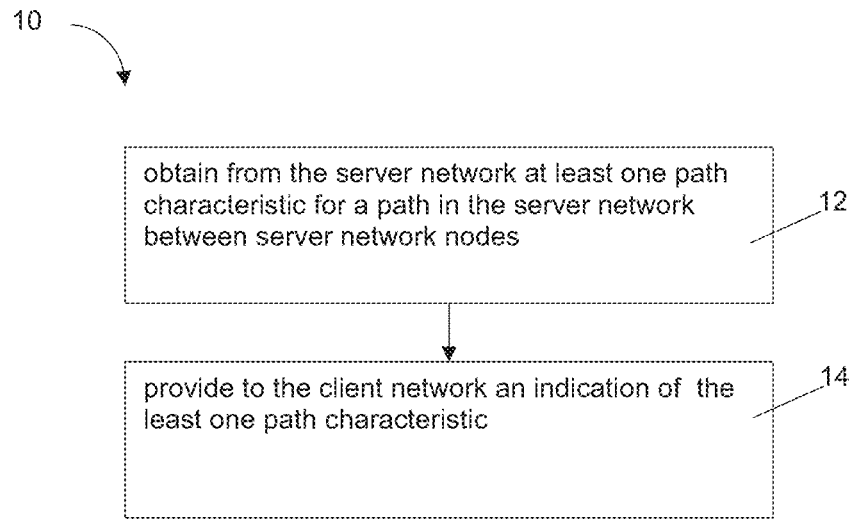
FIG. 1 shows the steps of a method according to an embodiment of the disclosure of controlling a multi-layer communication network comprising a client network and a server network.

Referring to FIG. 1, an embodiment of the disclosure provides a method 10 of controlling a multi-layer communication network comprising a client network and a server network. The method 10 comprises obtaining in a step 12 from the server network at least one path characteristic for a path in the server network between server network nodes. The method 10 further comprises providing in a step 14 to the client network an indication of the at least one path characteristic of the server network. In some aspects, the providing in step 14 further comprises providing information of a plurality of client network links. In some examples, the step 14 comprises providing, for the client network links, an indication of the at least one path characteristic corresponding to the server network, e.g. the at least one path characteristic for a corresponding path in the server network. The method may be carried out in a control entity, e.g. MDSC, as described in more detail below.

The method may enable communication of information from a server network to a client network in a multi-layer communication network. This is not possible under the current ACTN framework specification and the method may provide a solution to this limitation of the current ACTN framework specification. By providing the client network with a path characteristic for each client network link, based on a corresponding path in the server network, the method may enable the client network to better configure paths in the client network, e.g. configure protection schemes and restoration schemes within the client network.

In an embodiment, the at least one path characteristic comprises at least one service characteristic of the server layer path and/or server network topological information related to the path. This may enable the client network to properly configure protection schemes and restoration schemes within the client network. In some examples, the obtained path characteristic may be considered as Traffic Engineering (TE) information about the server network connectivity.

In an embodiment, the at least one characteristic of the path (e.g. service characteristic) comprises at least one of bandwidth, delay, delay variation, error rate, packet drop probability and packet congestion status. In a further example, the characteristic of the server network (e.g. server network topological information) comprises an indication of a shared risk link group, SRLG, for link(s) of the server network that implement the path. This information may enable the client network to properly configure protection schemes and restoration schemes within the client network.

Figure 2:
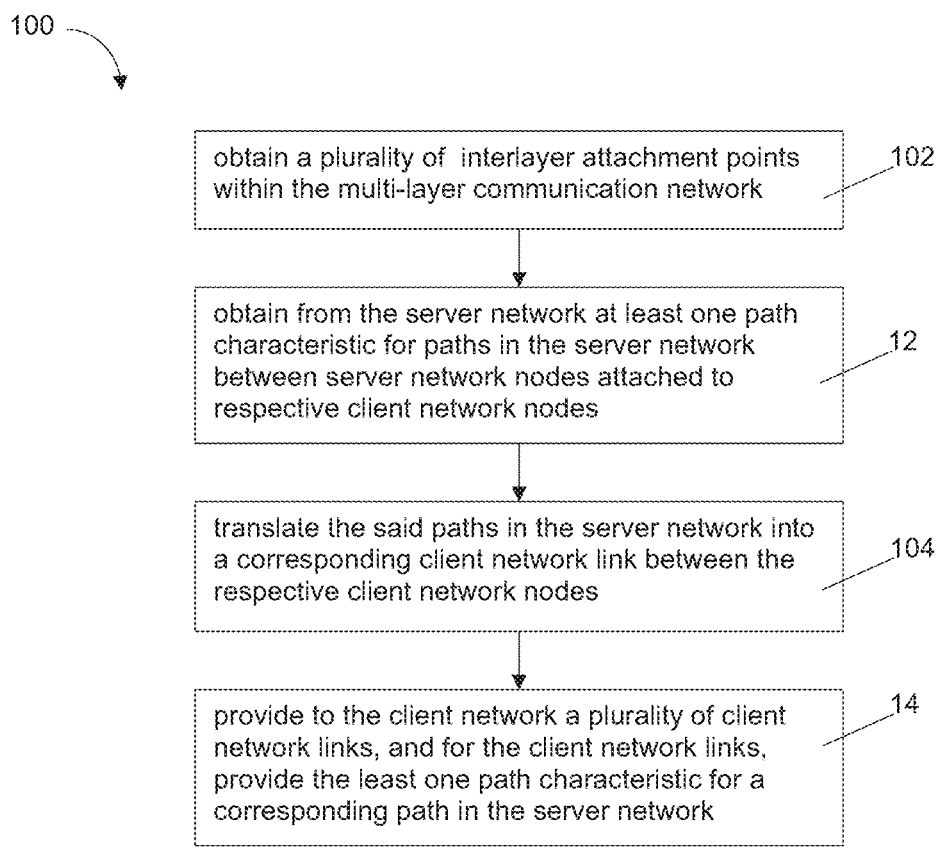
FIG. 2 shows the steps of a method according to a further embodiment of the disclosure of controlling a multi-layer communication network comprising a client network and a server network.

Referring to FIG. 2, an embodiment of the disclosure provides a method 100 of controlling a multi-layer communication network comprising a client network and a server network. The method 100 of this embodiment comprises obtaining 102 information identifying a plurality of interlayer attachment points within the multi-layer communication network at each of which there exists an interlayer attachment between a respective client network node and a respective server network node. The method 100 further comprises obtaining in a step 12 from the server network at least one path characteristic for paths in the server network between server network nodes attached to respective client network nodes. The method further comprises translating 104 paths into a corresponding client network link between client network nodes. The client network nodes are at the respective interlayer attachment points. The method may be carried out in a MDSC. The path information transmitted to the client network is based on the path information received from the server network. The transmitted path information may be processed or modified prior to being transmitted to the client network. For example, the path information may be aggregated to correspond to a client layer link, abstracted or classified prior to transmission. Thus, the indication of the server path information transmitted to the client layer may be the same as, or based on (and different to), the server path information received from the server layer.

The method further comprises providing 14 to the client network a plurality of client network links, and providing for the client network links the at least one path characteristic for a corresponding path in the server network.

As will be readily understood by the skilled person, interlayer attachments between server network nodes and client network nodes represent references between the two networks to provide connectivity service. The nodes at which interlayer attachments exist may be referred to as interlayer attachment points.

The current ACTN framework defines Physical Network Controllers, PNC, that interface directly with a network and are responsible for its full control. For many reasons, it may be necessary to split a network into several sub-networks, each controlled by its own PNC. For example, a network provider may not want to expose the details of its products, thus they need to be controlled with a proprietary PNC, with non-standard interfaces towards the nodes. In a further example, a network may be too large and pose scalability challenges for a PNC implemented in a single application; or a network operator may want to split the administration (and control) of its network into different domains. In order to meet these needs, the ACTN framework defines Multi-domain Service Controllers, MDSC, to allow integration of several PNCs into a single large scale network. The ACTN framework allows the deployment of a hierarchy of MDSCs, supporting the definition of complex control architectures.

In this embodiment, the method is implemented at an MDSC within the ACTN framework; this MDSC may therefore be considered as being responsible for network layering and referred to as an MDSC-L. An aspect of the disclosure provides for an MDSC implementing the functions described.

Figure 3:
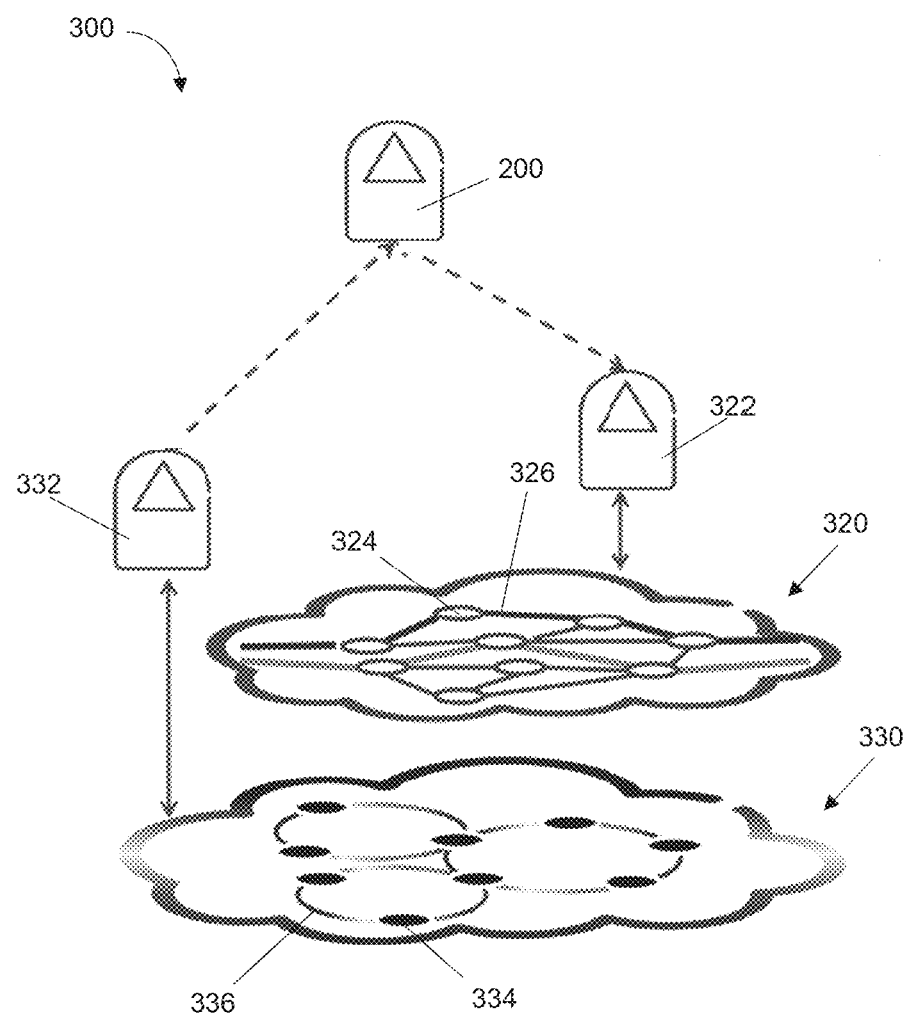
FIG. 3 illustrates a multi-layer communication network according to an embodiment of the disclosure.

Referring to FIG. 3, an embodiment of the disclosure provides a multi-layer communication network 300 comprising a client network (i.e. client layer) 320, a server network (i.e. server layer) 330 and a multi-layer network control entity, or service controller, (MDSC) 200. The client network 320 comprises a plurality of client network nodes 324, a plurality of links 326 connecting the client network nodes and a client network control entity 322. In some aspects, the client network control entity 322 is a PNC, i.e. client PNC, configured to control a client layer of the network.

The server network 330 comprises a plurality of server network nodes 334, a plurality of links 336 connecting the server network nodes, and a server network control entity 332. In some aspects, the server network control entity 332 is a PNC, i.e. server PNC configured to control a server layer of a network. In an embodiment, the server network is an optical network and the client network is a packet network. The packet network uses the server optical network to transport packets. Alternatively, the network may be considered as comprising a server layer being an optical layer, and a client layer being a packet layer.

The multi-layer network control entity 200 is communicatively connected to each of the client network control entity and the server network control entity. The multi-layer network control entity 200 may be considered as an MDSC, e.g. MDSC-L.

The multi-layer network control entity 200, client network control entity 322 and server network control entity 332 may each be considered as a SDN controllers. The SDN controllers are arranged as a hierarchy of SDN controllers. The MDSC 200 may be considered as at a higher level in the hierarchy than the client and server layer PNCs 322,332 to which the MDSC is connected. The client and server layer PNCs 322,332 control different layers of the same domain.

The multi-layer network control entity 200, client network control entity 322 and server network control entity 332 are a hierarchy of SDN controllers. The client network control entity 322 and server network control entity 332 cannot communicate directly. All communication between the client network control entity 322 and server network control entity 332 is via at least one further control entity, e.g. a higher level control entity (MDSC) 200. The MDSC 200 may be considered as a parent controller to the client layer PNC and server layer PNC. Any aspect of the ACTN architecture or functionality may be considered as implemented as part of the present solution.

The MDSC-L connects with at least two PNCs controlling networks in a client-server relationship. The MDSC (e.g. referring to the MDSC-L) connects to both the server and client PNC 322,332. Aspects of the disclosure provide for a transfer of information relating to the server network from the server PNC to the client PNC, via the MDSC (e.g. MDSC-L). The multi-layer communication network according to examples of the disclosure provides an interface between SDN controllers, according to the ACTN framework, In some aspects, the MDSC is arranged in an architecture between a Customer Network Controller (not shown) configured to issue connectivity requests and the PNCs configured to manage the physical network resources). The MDSC can be co-located with at least one of the PNCs. The MDSC is able to implement at least one of the four ACTN main functionalities, i.e. multi-domain coordination function, virtualization/abstraction function, customer mapping function and virtual service coordination.

The Physical Network Controllers described are configured to control configuring the network elements, monitoring the physical topology of the network. In some examples, a PNC is configured to pass the physical topology, either raw or abstracted, to the MDSC. A PNC, in addition to being in charge of controlling the physical network, is able to implement at least one of the ACTN main functionalities of: multi domain coordination function and virtualization/abstraction function.

Referring to FIGS. 4 to 7, an embodiment of the disclosure provides a method of controlling a multi-layer communication network 110 comprising a client network 120 and a server network 130. An embodiment also provides an apparatus for controlling the network 110.

Figure 4:
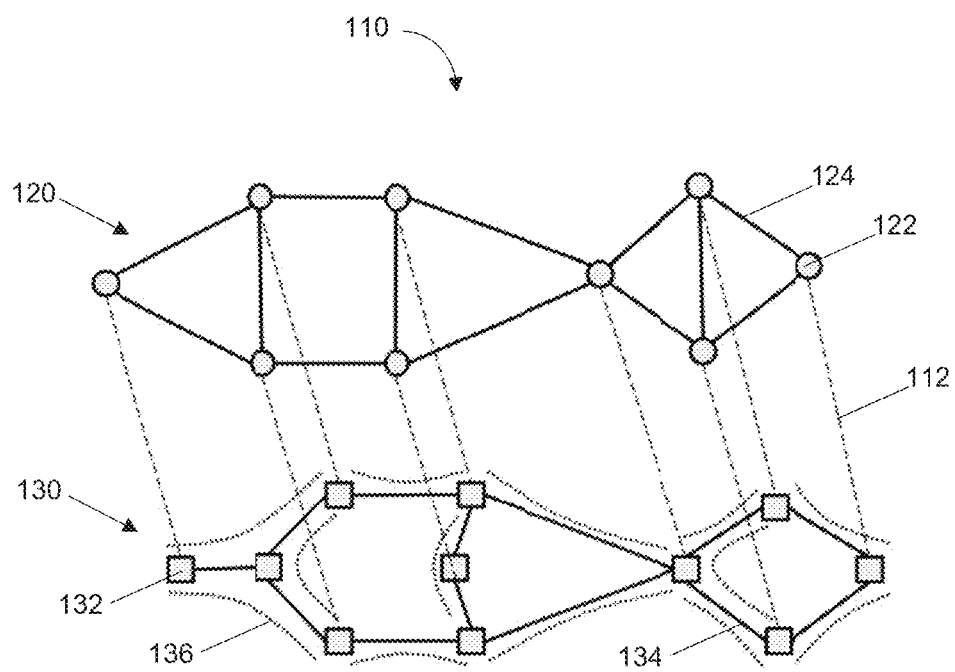
FIG. 4 illustrates a multi-layer communication network in which a method according to a further embodiment of the disclosure of controlling a multi-layer communication network comprising a client network and a server network is applied.

FIG. 4 illustrates a multi-layer communication network 110 comprising the client network 120, which may also be referred to as the client layer; and the server network 130, which may also be referred to as the server layer.

The client network comprises a plurality of client network nodes 122, a plurality of client network links 124 connecting the nodes and a client PNC (not shown). The server network comprises a plurality of server network nodes 132, a plurality of server network links 134 connecting the nodes and a server PNC (not shown).

The dashed lines 112 are interlayer attachments between server network nodes and client network nodes, through which the connectivity service is provided. The dotted lines 136 are paths configured in the server network that implement client network link connectivity.

FIG. 4 presents an example of full network information. However, each control entity, i.e. the MDSC-L and the PNCs, maintains only partial network information sufficient to perform its functions, excluding pieces of information not relevant to its role.

For example, the MDSC-L collects from the server PNC full information about path connectivity, e.g. between interlayer attachment points. The connectivity is implemented by the paths 136 in the server network. The path information may include service characteristics, e.g. bandwidth, delay, topological information relevant for the client layer, e.g. SRLG.

In some examples, the MDSC-L does not collect topology information about the server layer. That is to say, the MDSC-L may have an abstract view of the server layer network, maintaining only service information.

Figure 5:
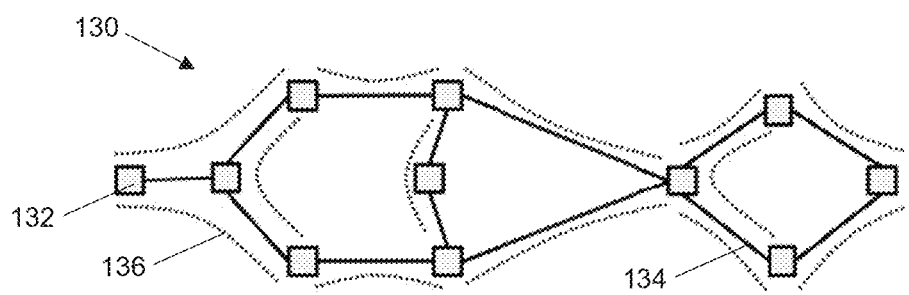
FIG. 5 shows the server network of FIG. 4.

FIG. 5 shows an example of server layer information, as described above. In some examples, the MDSC-L does not collect topology information of the server layer. That is to say, the MDSC-L may have an abstract view of the server layer network, maintaining only service information. For example, the server link topology information is not known to the MDSC-L. In some examples, the MDSC-L obtains information relating to the paths 136 of the server layer.

The MDSC-L provides to the client PNC information about the service connectivity provided by the server layer. In some examples, the MDSC-L is configured to translate the interlayer attachment points into references useable by (sensible for) the client network representation in the client PNC. Thus, an example of the described method comprises translating the server network paths and interlayer attachments into client network links between client network nodes. Thus, the MDSC-L is configured to associate a server layer path, and the server layer path characteristic information, with a corresponding link in the client layer.

Figure 6:
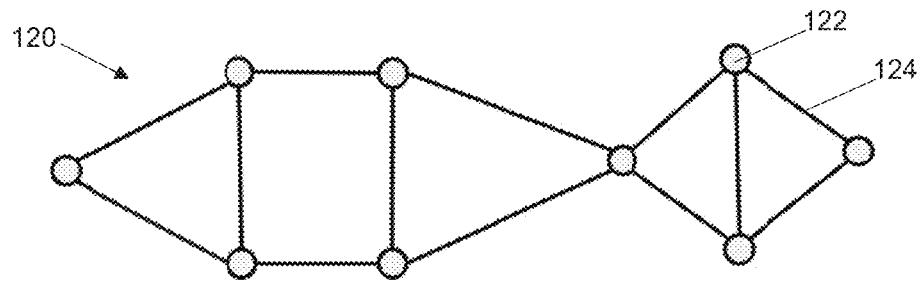
FIG. 6 shows the client network of FIG. 4.

In some examples, the client network links are entirely passed to the client PNC by the MDSC-L. The MDSC-L does not perform any kind of abstraction or summarization of the client network links. The client layer information stored by the client PNC is illustrated in FIG. 6. The client layer (network) 120 comprises a plurality of client network nodes 122, a plurality of client network links 124 connecting the nodes. Client network link information is provided by the MDSC-L, calculated from connectivity service information, i.e. for server layer paths, received from the server PNC.

The MDSC-L maintains topology information about the interlayer attachments between the client and the server networks. The interlayer attachment points represent the references between the two networks to provide service.

Figure 7:
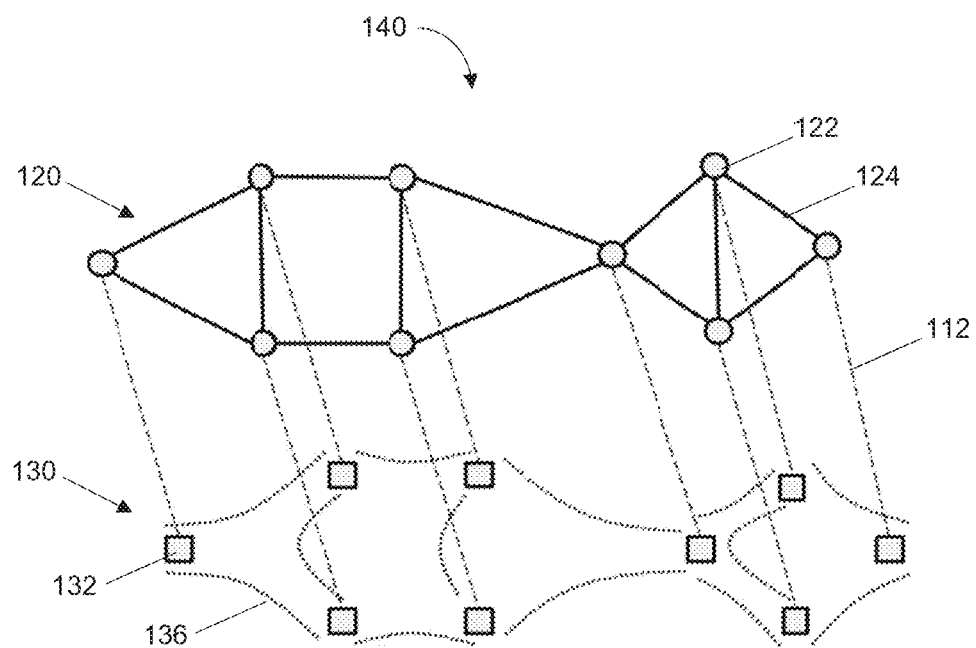
FIG. 7 illustrates the information about the network of FIG. 4 used in the applied method.

FIG. 7 illustrates an example of the network information maintained by the MDSC-L, including interlayer attachment points, full client network topology and server path connectivity. The elements shown are as described above. This example shows that server link topology information is not known to (or used by) the MDSC-L.

The method of an embodiment defines enhancements to the ACTN framework to deal with multi-layer networks. The MDSC-L, used for layering information management, collects from one or more server PNC information which is relevant for the client PNCs. The interface between an MDSC-L and a client PNC is defined such that this information can be sent from the MDSC-L to the client PNC. This flow of information (e.g. server layer path characteristic information) from MDSC-L to client PNC is not provided for by the current ACTN framework specification.

The information that is communicated from the server PNC to the client PNC(s) via the MDSC-L may comprise server layer traffic engineering, TE, characteristics. The communicated information allows the client PNC to be able to effectively control the client layer, for example, by computing paths in the client layer. For example, the computed paths mays be label switched paths, LSPs, in the client layer. For example, the client PNC is able to use the information to compute LSPs with constraints (e.g. diversity, delay, etc.) in the client layer. Hence, the MDSC-L collects, from the server layer PNC, TE information about the connectivity it creates (e.g., SRLG). The MDSC-L is further configured to maintain topology information on the connectivity between client and server networks. The PNCs do not maintain information about the connectivity between client and server networks, the PNCs keep only information about themselves. The MDSC-L sends to the client PNC the TE information, mapped onto the client network nodes and links.

This method is part of a SDN-based control plane architecture, ACTN. This allows the architecture to be properly used in a multi-layer network. In particular, the method enables correct definition of protection and restoration schemes on a client network layer by providing these with relevant information (e.g. TE information) collected from server network layer. This is not possible with the current ACTN framework if networks in different layers, for example in a client-server relationship, are controlled by different PNCs.

Figure 8:
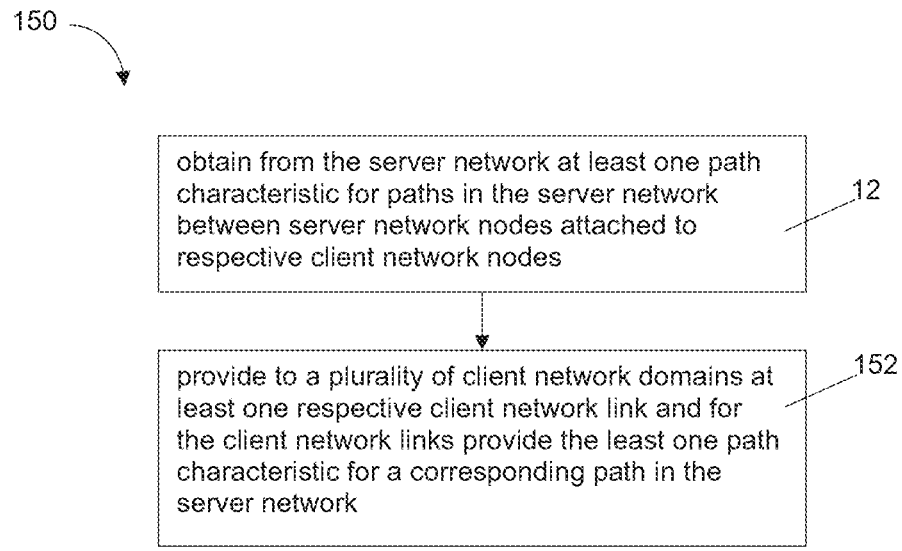
FIG. 8 shows the steps of a method according to a further embodiment of the disclosure of controlling a multi-layer communication network comprising a client network and a server network.

Referring to FIG. 8, an embodiment of the disclosure provides a method 150 of controlling a multi-layer communication network comprising a client network and a server network. In this embodiment, the client network comprises a plurality of client network domains. The method 150 comprises obtaining 12 from the server network at least one path characteristic for at least one path in the server network between server network nodes. The server network nodes are considered as attached to respective client network nodes. The method 150 further comprises providing 152 to a plurality of client network domains at least one path characteristic for a path in the server network. In some aspects, the information provided to the client network comprises at least one respective client network link. The path characteristic is provided for a client network link(s), corresponding to a path in the server network.

The method may enable communication of information from a server network to client network domains of a client network comprising a plurality of domains. By providing the client network domains with a path characteristic, for a corresponding path in the server network, for client network link within the client network domain the method may enable the client network to properly configure protection schemes and restoration schemes within the client network, including within and between client network domains.

In an embodiment, the method is implemented at an MDSC of the multi-layer control network, according to the ACTN framework. The at least one path characteristic for each path in the server network is obtained from a PNC of the server network. At least one path characteristic for at least one client network link is provided to a PNC of client network domains. In some examples, information of the plurality of client network links is also provided to the client network domains. The PNCs are as defined in the ACTN framework.

In an embodiment, a method of the disclosure comprises a further step of abstracting link topology information for the plurality of client domains, to represent the client network in an abstracted form. The abstraction of the link topology information about the client network domains is performed according to the ACTN framework.

In an embodiment, the step of abstracting link topology information for the plurality of client domains is performed as a further function of the MDSC or in a further MDSC, e.g. according to the ACTN framework. This further MDSC or further function may be considered as being an abstraction MDSC and referred to as an MDSC-A.

Figure 9:
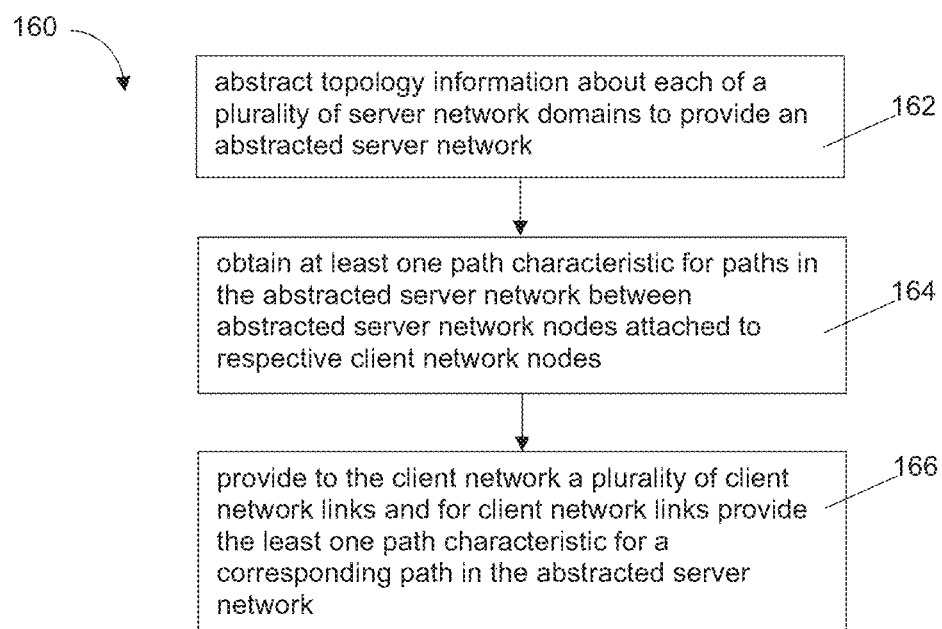
FIG. 9 shows the steps of a method according to a further embodiment of the disclosure of controlling a multi-layer communication network comprising a client network and a server network.

Referring to FIG. 9, an embodiment of the disclosure provides a method 160 of controlling a multi-layer communication network comprising a client network and a server network. In this embodiment, the server network comprises a plurality of server network domains. The method 160 comprises abstracting 162 topology information about each of the plurality of server network domains to represent the server network in an abstracted form, which will be referred to as an 'abstracted server network'. The method further comprises obtaining 164 from the server network at least one path characteristic for paths in the abstracted server network between abstracted server network nodes attached to respective client network nodes The method further comprises providing 166 to the client network, for a client network link, information on at least one path characteristic, corresponding path in the abstracted server network.

The abstraction may enable communication of information from the server network to the client network, whilst hiding topology information about the server network domain from higher network control layers (e.g. the client layer PCN). In an embodiment, the abstraction of the topology information about the server network domains is performed according to the ACTN framework.

In an embodiment, the method is implemented at an MDSC of the multi-layer control network, according to the ACTN framework. The at least one path characteristic for the path in the server network is obtained from a PNC of the server network, and for client network links the at least one path characteristic are provided to a PNC of a or each client network domain. In some examples, the plurality of client network links are provided to a PNC of the client network domain. The PNCs are as defined in the ACTN framework. In an embodiment, the server network is an optical network. The client network is a packet network.

Figure 10:
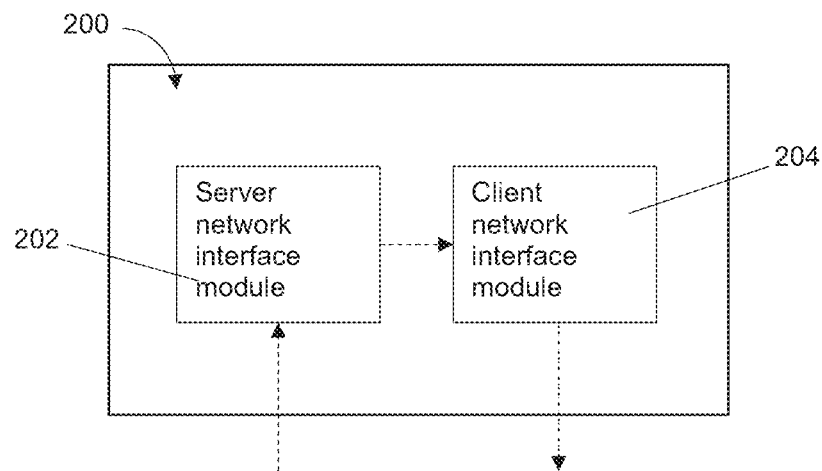
FIG. 10 is a schematic representation of a control entity for a multi-layer communication network comprising a client network and a server network, according to an embodiment of the disclosure.

Referring to FIG. 10, an embodiment of the disclosure provides a control entity 200 for a multi-layer communication network comprising a client network and a server network. The control entity 200 is an example of the MDSC. The control entity comprises a server network interface module 202 and a client network interface module 204.

The server network interface module 202 is configured to obtain from the server network at least one path characteristic for paths in the server network. In some examples, at least one path characteristic is obtained for each path in the server network. In some aspects, the obtained path characteristics are for paths between server network nodes attached to respective client network nodes.

In some aspects, the client network interface module 204 is configured to provide to the client network a plurality of client network links. In some aspects, the client network interface module 204 is configured to provide to the client network, for a or each client network link, the at least one path characteristic for a corresponding path in the server network.

The method may enable communication of information from a server network (i.e. server layer) to a client network (i.e. network layer) in a multi-layer communication network. By providing the client network with a path characteristic, for a corresponding path in the server network, for each client network link the method may enable the client network to properly configure protection schemes and restoration schemes within the client network.

In an embodiment, the at least one path characteristic comprises at least one service characteristic of the path and/or server network topological information related to the path. This may enable the client network to properly configure protection schemes and restoration schemes within the client network.

In an embodiment, the at least one service characteristic of the path comprises at least one of bandwidth, delay, delay variation, error rate, packet drop probability and packet congestion status. The server network topological information may comprise a shared risk link group, SRLG, for each link of the server network that implements the path. This may enable the client network (i.e. client layer PNC) to properly configure protection schemes and restoration schemes within the client network.

In an embodiment, the server network interface module 202 is configured to obtain information identifying a plurality of interlayer attachment points within the multi-layer communication network at each of which there exists an interlayer attachment between a respective client network (i.e. client layer) node and a respective server network (i.e. network layer) node. The server network interface module 202 is configured to obtain from the server network at least one path characteristic for paths in the server network between server network nodes attached to respective client network nodes. The control entity 200 further comprises a link computation module configured to translate each path into a corresponding client network link between the client network nodes at the respective interlayer attachment points. The client network interface module 204 is configured to provide to the client network the client network links and for the client network links the at least one path characteristic for a corresponding path in the server network.

In an embodiment, the control entity 200 is an SDN controller. In an embodiment, the control entity is an MDSC-L. In some aspects, the client network comprises a client PNC and the server network comprises a server PNC, as described with reference to FIGS. 4 to 7 above. The client PNC and server PNC may also be considered as SDN controllers. The server network interface module 202 is configured to obtain the at least one path characteristic from the server PNC. The client network interface module 204 is configured to provide the client network links, and for each client network link the at least one path characteristic for a corresponding path in the server network, to the client PNC.

In an embodiment, the client network comprises a plurality of client network domains. The client network interface module 204 is configured to provide to a client network domain (e.g. to the client PNC) at least one path characteristic for a client network link corresponding to a path in the server network. In some aspects, the client network interface module 204 provides at least one respective client network link to the client network control entity.

In an embodiment, the link computation module is configured to, for a, each or a plurality of client network domains, translate a path, a plurality of paths or each path in the server network relevant to the client network domain into a corresponding topological link between the respective client network nodes at the respective interlayer attachment points.

In an embodiment, the server network comprises a plurality of server network domains. The abstraction module is configured to abstract topology information about the plurality of server network domains to represent the server network in an abstracted form, which will be referred to as an 'abstracted server network'. The server network interface module 202 is configured to obtain from the server network at least one path characteristic for a plurality or each path in the abstracted server network between abstracted server network nodes attached to respective client network nodes. The client network interface module 204 is configured to provide to the client network, for each client network link the at least one path characteristic for a corresponding path in the abstracted server network. In some examples, the client network interface module 204 is configured to provide to the client network information of a plurality of client network links.

In an embodiment, the abstraction module is configured to perform the abstraction according to the ACTN framework.

Figure 11:
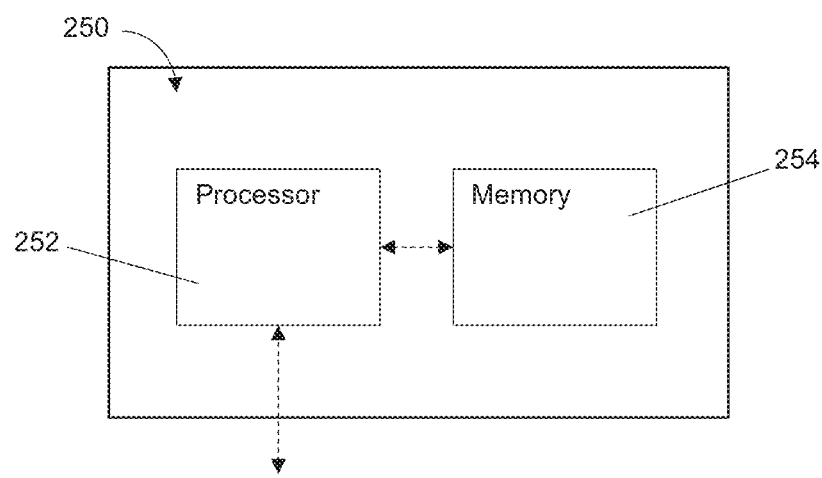
FIG. 11 is a further example of a schematic representation of a control entity for a multi-layer communication network comprising a client network and a server network, according to an embodiment of the disclosure.

Referring to FIG. 11, a further embodiment of the disclosure provides a control entity 250 for a multi-layer communication network comprising a client network and a server network. The control entity comprises a processor 252 and a memory 254. The memory contains instructions executable by the processor, whereby the control entity is operative to implement the method described in any example. The control entity may be the MDSC-L. For example, the control entity is operative to obtain from the server network at least one path characteristic for a path in the server network between server network nodes. In some examples, an indication of the at least one path characteristic is provided to the MDSC-L. The control entity is further configured to provide to the client network (e.g. to the client PNC) an indication of the at least one path characteristic of the server network. In some examples, the indication of the path characteristic is a value of the path characteristic, an indicator used as the path characteristic, or an index or a pointer to a stored value of the path characteristic. In some aspects, the control entity (MDSC-L) may be considered as providing the path characteristic to the client network, e.g. mapped to a link of the client network. In further aspects, the control entity 250 is the server PNC or client PNC.

In some aspects, the memory contains instructions executable by the processor, whereby the control entity is operative to obtain from the server network at least one path characteristic for each path in the server network between server network nodes attached to respective client network nodes; and provide to the client network a plurality of client network links and for each client network link the at least one path characteristic for a corresponding path in the server network.

In an embodiment, the server network interface module 202 and the client network interface module 204 described above are implemented as a computer program running on the processor 252. In an embodiment, the memory 254 contains information specifying a plurality of interlayer attachment points within the multi-layer communication network at each of which there exists an interlayer attachment between a respective client network node and a respective server network node.

Figure 12:
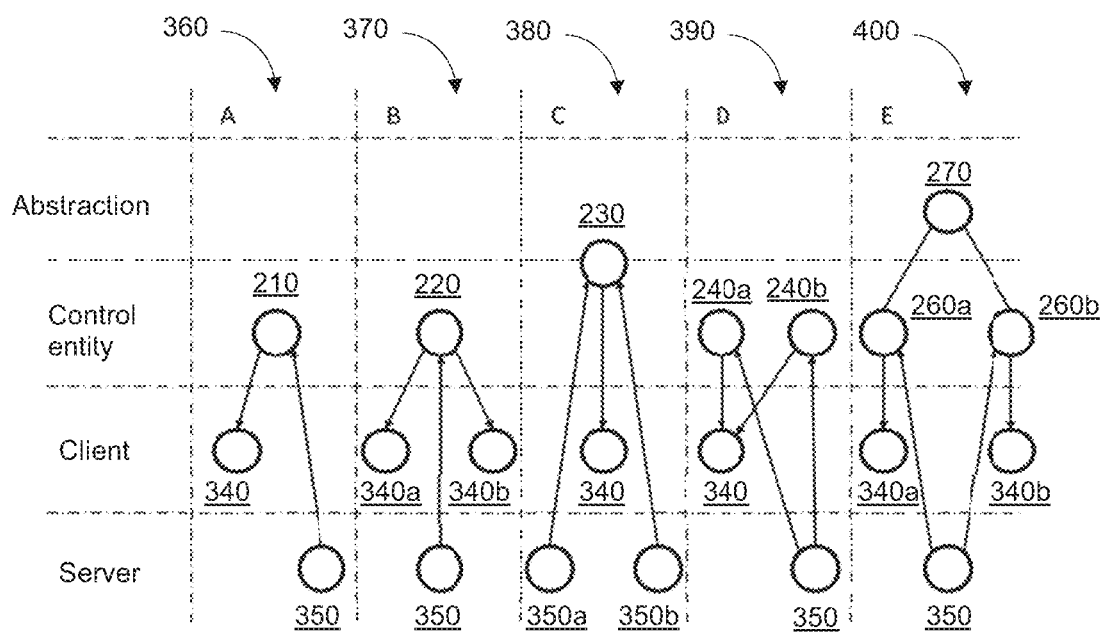
FIG. 12 illustrates a number of multi-layer communication networks in columns A through E according to respective embodiments of the disclosure.

Referring to FIG. 12 column A, an embodiment of the disclosure provides a multi-layer communication network 360 comprising a client network comprising a client PNC 340, a server network comprising a server PNC 350 and an MDSC-L 210. The MDSC-L is configured for communication with the client PNC and the server PNC and operates as described above, with reference to FIGS. 3 to 7.

Referring to FIG. 12 column B, an embodiment of the disclosure provides a multi-layer communication network 370 which is similar to the network 360 of FIG. 12 column A, with the following modifications. In this embodiment, the client network is split into a first and second domain, the first and second domains being controlled by a respective first and second client PNC 340a, 340b. There is no requirement for information abstraction in this embodiment. The MDSC-L 220 provides each client PNC with the at least one path characteristic for each client network link, for a corresponding path in the server network. The MDSC-L 220 may further provide each of the first and second client PNC with the client network links relevant to its domain. In this example, inter-domain client links are only known to the MDSC-L 220 and not to the client PNCs 340a, 340b.

Referring to FIG. 12 column C, an embodiment of the disclosure provides a multi-layer communication network 380 which is similar to the network 360 of FIG. 12 column A, with the following modifications. In this embodiment, the server network is split into a first and second domain, the first and second domains being controlled by a respective first and second server PNC 350a, 350b. The MDSC 230 is configured to abstract topology information about each of the plurality of server network domains to represent the server network in an abstracted form. Inter-domain links and connections are fully controlled by the MDSC.

Referring to FIG. 12 column D, an embodiment of the disclosure provides a multi-layer communication network 390 which is similar to the network 360 of FIG. 12 column A, with the following modifications. In this embodiment, which implements network slicing, the client PNC 340 and the server PNC 350 control single domain networks. These networks are presented to independent network operators and split into resource subsets that are controlled independently. The network 390 therefore comprises two MDSC-Ls 240a, 240b. Each resource subset is controlled by its own MDSC-L. No information abstraction is required.

Figure 13:
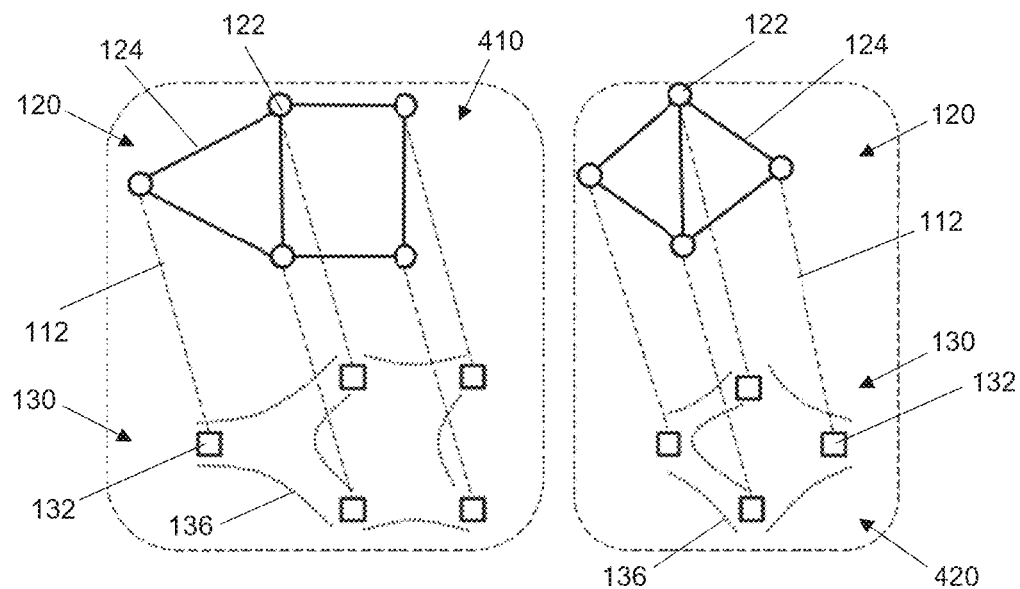
FIG. 13 is a schematic representation of a multi-layer communication network comprising a client network and a server network, according to an embodiment of the disclosure.
Figure 14:
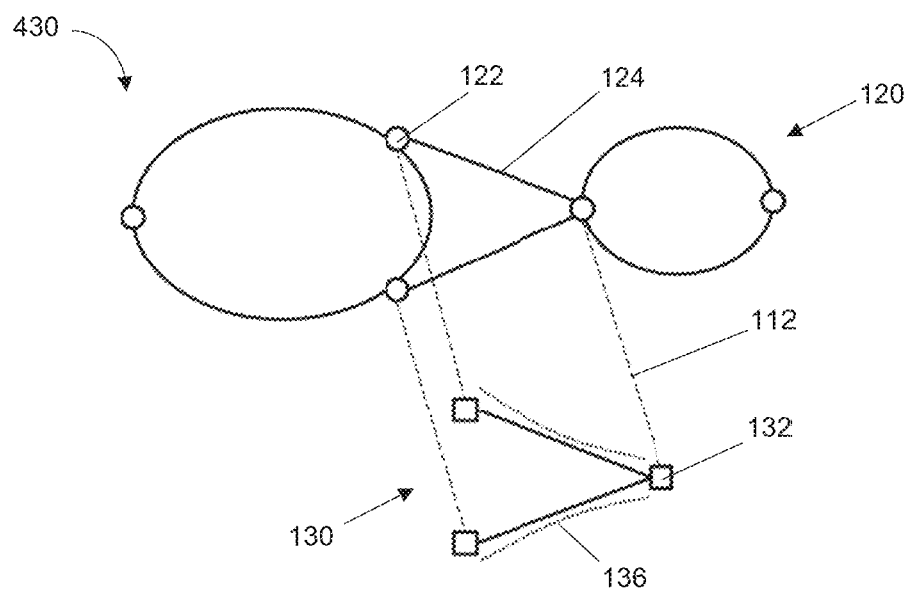
FIG. 14 is a schematic representation of an abstraction of a multi-layer communication network according to an embodiment of the disclosure.

Referring to FIG. 12 column E and FIGS. 13 and 14, an embodiment of the disclosure provides a multi-layer communication network 400 which is similar to the network 360 of FIG. 12 column A, with the following modifications.

In this embodiment, the client network comprises a first and second client network domains, the first and second domains being controlled by a respective first and second client PNC 340a, 340b. In addition, there are two MDSC-Ls 260a, 260b. Each MDSC-L is configured for communication with its respective client PNC and with the server PNC 350.

If client network topology abstraction is needed, for example for scalability, a further MDSC configured to perform the abstraction is provided, referred to as an MDSC-A. The MDSC-A 270 is configured for communication with each of the MDSC-Ls 260a, 260b and is configured to receive summarized or abstract topology information from its subtended MDSC-Ls. This is especially useful for scalability reasons, when a network is too large to be managed by a single SDN controller. It is worth noting that MDSC-L and MDSC-A roles are mutually exclusive. This is due to the fact that the MDSC-L needs to handle full topology information to be sent to its subtended client PNCs. The MDSC-A has also full control of inter-domain links and connections on both client and server layers.

FIG. 13 shows the view of an example client network 120 and the server network 130 held at the two MDSC-Ls 260a, 260b. The network is as shown in FIGS. 4 to 6. The first MDSC-L 260a holds a network view 410 related to the client domain controlled by the first client PNC 340a and the second MDSC-L 260b holds a network view 420 related to the client domain controlled by the second client PNC 340b FIG. 14 shows an example of an abstracted view of the client network 120 and the server network 130 held by the MDSC-A 270.

Each control entity (e.g. PNC or MDSC-L) 200, 210, 220, 230, 240, 250 and the MDSC-A 260 could be implemented as one or more processors, hardware, processing hardware or circuitry. References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

An aspect of the disclosure may relate to the client network control entity, e.g. client network PNC. The client network control entity is configured to receive from the higher control entity, e.g. MDSC(-L), information relating to the server network. The server network information is associated with the client network, i.e. corresponds to links of the client network. In particular, the client network control entity (PNC) is configured to receive a path characteristic information of the server layer, as described above. In some aspects, the client network control entity is configured to configure the client layer based on the received path characteristics.

Figure 15:
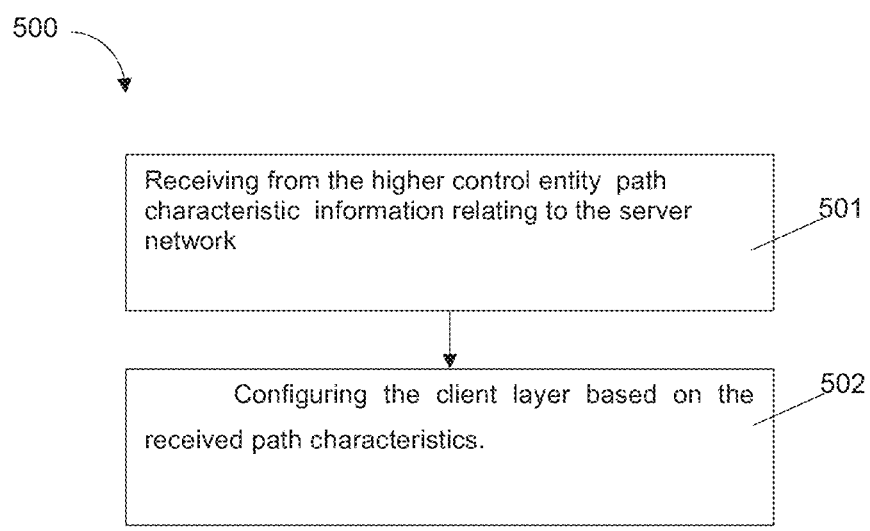
FIG. 15 shows the steps of a method according to a further embodiment of the disclosure of controlling a client network.

FIG. 15 shows a method 500 of operating a client network control entity (i.e. client layer PNC). In 501, the client network control entity receives from the higher control entity, e.g. MDSC-L, information relating to the server network. The information may be received by an interface module. For example, the information is path characteristic information, e.g. TE information, delay, SRLG, as described above. In 502, the client network control entity configures the client layer based on the received path characteristics.

A further aspect of the disclosure may relate to the server network control entity, e.g. server network PNC. The server network control entity is configured to transmit to the higher control entity, e.g. MDSC(-L), information relating to the server network. In particular, the server network control entity (PNC) is configured to transmit a path characteristic information of the server layer, as described above. The information is subsequently translated into links used by the client network, and transmitted to the client network (i.e. client PNC). In some aspects, the client network control entity is configured to configure the client layer based on the received path characteristics. Aspects of the disclosure may further relate to a method of operating the server network control entity to provide these described functions.

A further aspect of the disclosure may relate to the multi-layer communications network, comprising a client network control entity (client PNC) configured to control a client network comprising a plurality of client network nodes, and a server network control entity (server PNC) configured to control a server network comprising a plurality of server network nodes. The network further comprises a multi-layer network control entity (MDSC) communicatively connected to each of the client network control entity and the server network control entity. The multi-layer network control entity is configured to obtain from the server network at least one path characteristic for paths in the server network between server network nodes, e.g. attached to respective client network node. The multi-layer network control entity is further configured to provide to the client network a plurality of client network links and for each client network link the at least one path characteristic for a corresponding path in the server network.

A further embodiment of the disclosure provides a computer program, comprising instructions which, when executed on at least one processor, cause the at least one processor to carry out any of the steps of the above described method of controlling a multi-layer communication network comprising a client network and a server network.

In a further example, the control entity comprises a processor and a memory, the memory containing instructions that when executed by the processor cause the processor to obtain from the server network at least one path characteristic for a path in the server network between server network nodes; and provide to the client network an indication of the at least one path characteristic of the server network. In a further example, the control entity is the client layer control entity or the server layer control entity, and comprises a processor and a memory, the memory containing instructions that when executed by the processor cause the processor to carry out the method or functions of any example.

A further embodiment of the disclosure provides a carrier containing a computer program, comprising instructions which, when executed on at least one processor, cause the at least one processor to carry out any of the steps of the above method of controlling a multi-layer communication network comprising a client network and a server network. The carrier is one of an electronic signal, optical signal, radio signal, or computer readable storage medium.

The invention claimed is:

1. A client physical network controller (PNC) configured to control a client layer of a multi-layer communication network comprising the client layer and a server layer, the client PNC comprising:
   at least one processor; and at least one memory comprising computer-executable instructions that, when executed by the at least one processor, configure the client PNC to:
receive, from a multi-domain service controller (MDSC) in the multi-layer communication network, indication of at least one characteristic associated with one or more paths between server network nodes in the server layer, wherein the server layer is controlled by a server layer physical network controller; and
based on the at least one characteristic, compute one or more paths in the client layer that facilitate protection and/or restoration for the one or more paths in the server layer.

2. The client PNC of claim 1, wherein the at least one characteristic comprises one or more of the following:
links between client network nodes, in the client layer, that correspond to interlayer attachments between the client layer and the server layer;
link characteristics associated with the respective links between client network nodes;
one or more Shared Risk Link Groups (SRLGs) in the server layer; and
traffic engineering (TE) information for the server layer.

3. The client PNC of claim 1, wherein the one or more paths in the client layer comprise a plurality of label switched paths (LSPs) having one or more constraints in accordance with the at least one characteristic of the path in the server layer.

4. The client PNC of claim 3, wherein the one or more constraints for the LSPs include any of the following: path diversity, delay, delay variation, and bandwidth.

5. The client PNC of claim 1, wherein the one or more paths in the client layer are computed based on the at least one characteristic of the path in the server layer, without any further knowledge about connectivity between the client layer and the server layer.

6. A method of controlling a client layer of a multi-layer communication network that also includes a server layer, the method comprising:
receiving, at a client physical network controller (PNC), an indication of at least one characteristic associated with one or more paths between server network nodes in the server layer, wherein:
the indication is received from a multi-domain service controller (MDSC) in the multi-layer communication network, and
the server layer is controlled by a server PNC; and
based on the at least one characteristic, computing one or more paths in the client layer that facilitate protection and/or restoration for the one or more paths in the server layer.

7. The method of claim 6, wherein the at least one characteristic comprises one or more of the following:
links between client network nodes, in the client layer, that correspond to interlayer attachments between the client layer and the server layer;
link characteristics associated with the respective links between client network nodes;
one or more Shared Risk Link Groups (SRLGs) in the server layer;
traffic engineering (TE) information for the server layer.

8. The method of claim 6, wherein the one or more paths in the client layer comprise a plurality of label switched paths (LSPs) having one or more constraints in accordance with the at least one characteristic of the path in the server layer.

9. The method of claim 8, wherein the one or more constraints for the LSPs include any of the following: path diversity, delay, delay variation, and bandwidth.

10. The method of claim 6, wherein the one or more paths in the client layer are computed based on the at least one characteristic of the path in the server layer, without any further knowledge about connectivity between the client layer and the server layer.

11. A multi-domain service controller (MDSC) for a multi-layer communication network comprising a client layer and a server layer, the MDSC comprising:
at least one processor; and
at least one memory comprising computer-executable instructions that, when executed by the at least one processor, configure the MDSC to:
obtain, from a server physical network controller (PNC) of the server layer, at least one characteristic associated with one or more paths between server network nodes in the server layer; and
provide, to a client PNC of the client layer, an indication of the at least one characteristic associated with the one or more paths in the server layer.

12. The MDSC of claim 11, wherein the at least one characteristic comprises one of more of the following:
one or more Shared Risk Link Groups (SRLGs) in the server layer;
traffic engineering (TE) information for the server layer;
topological information associated with the server layer;
one or more service characteristics associated with the server layer; and
interlayer attachments, between the client layer and the server layer, associated with the one or more paths in the server layer.

13. The MDSC of claim 11, wherein:
the at least one memory further comprises computer-executable instructions that, when executed by the at least one processor, configure the MDSC to translate the at least one characteristic, associated with the one or more paths in the server layer, into one or more links between client network nodes in the client layer; and
the indication identifies the links between client network nodes in the client layer.

14. The MDSC of claim 13, wherein:
the one or more links include a plurality of links;
execution of the instructions further configures the MDSC to translate the at least one characteristic, associated with the one or more paths in the server layer, into a respective plurality of link characteristics associated with the plurality of links; and
the indication also identifies the plurality of link characteristics.

15. The MDSC of claim 13, wherein:
the client layer comprises a plurality of client network domains controlled by a respective plurality of client PNCs;
execution of the instructions further configures the MDSC to translate the at least one characteristic, associated with the one or more paths in the server layer, is into one or more links between client network domains; and
the indication also identifies the one or more links between client network domains.

16. A method, for a multi-domain service controller (MDSC), of controlling a multi-layer communication network comprising a client layer and a server layer, the method comprising:
obtaining, from a server physical network controller (PNC) of the server layer, at least one characteristic associated with one or more paths between server network nodes in the server layer; and providing, to a client PNC of the client layer, an indication of the at least one characteristic associated with the one or more paths in the server layer.

17. The method of claim 16, wherein the at least one characteristic comprises one of more of the following:

one or more Shared Risk Link Groups (SRLGs) in the server layer;

traffic engineering (TE) information for the server layer;

topological information associated with the server layer;

one or more service characteristics associated with the server layer; and interlayer attachments, between the client layer and the server layer, associated with the one or more paths in the server layer.

18. The method of claim 16, wherein:

the method further comprises translating the at least one characteristic, associated with the one or more paths in the server layer, into one or more links between client network nodes in the client layer; and the indication identifies the links between client network nodes in the client layer.

19. The method of claim 18, wherein:

the one or more links include a plurality of links;

the at least one characteristic, associated with the one or more paths in the server layer, is further translated into a respective plurality of link characteristics associated with the plurality of links; and the indication also identifies the plurality of link characteristics.

20. The method of claim 18, wherein:

the client layer comprises a plurality of client network domains controlled by a respective plurality of client PNCs;

the at least one characteristic, associated with the one or more paths in the server layer, is further translated into one or more links between client network domains; and the indication also identifies the one or more links between client network domains.

* * * * *